Aug. 8, 1950     E. D. TILLYER     2,518,099
LENTICULAR CATARACT LENS

Original Filed April 7, 1945     2 Sheets-Sheet 1

INVENTOR.
EDGAR D. TILLYER
BY Louis L. Gagnon
ATTORNEY

Aug. 8, 1950     E. D. TILLYER     2,518,099
LENTICULAR CATARACT LENS

Original Filed April 7, 1945     2 Sheets-Sheet 2

INVENTOR.
EDGAR D. TILLYER
BY
Louis L. Gagnon
ATTORNEY

Patented Aug. 8, 1950

2,518,099

UNITED STATES PATENT OFFICE 2,518,099

LENTICULAR CATARACT LENS

Edgar D. Tillyer, Southbridge, Mass., assignor to American Optical Company, Southbridge, Mass., a voluntary association of Massachusetts Original application April 7, 1945, Serial No. 587,052. Divided and this application February 20, 1946, Serial No. 648,862

2 Claims. (Cl. 88—54)

1

This invention relates to improvements in ophthalmic lenses and more particularly to lenticular cataract lenses and to improved methods and processes for making the same.

This application is a division of my co-pending application Serial No. 587,052, filed April 7, 1945, now abandoned.

A principal object of the invention is to provide a new and improved series of lens blanks covering with a minimum number of units the greater part of the range of requirements for cataract prescriptive lenses providing a minimum number of multifocal additions for the range of multifocal prescriptions required and providing a new improved lens medium for the blanks that will be absorbent to selected radiations beyond the visible and more particularly the ultra-violet radiations.

Another main object of the invention is the provision of a new and improved lens medium that will be absorbent to selected radiations beyond the visible radiations, particularly the ultra-violet radiations and that will have a required index of refraction, an expansion substantially that of the medium of the multifocal additions so that parts will fuse and stay together, a dispersion so related to that of the medium of the multifocal additions so chromatic colors will be negligible and that will fuse thoroughly and clearly with the medium of the multifocal additions, and that is chemically stable and resistant to chemical change and oxidization so there will be no color changes or spots formed on the medium in use, either from chemical change or the running of time.

Other objects and advantages are:

The making of the units of the series in blank form so that the prescriptive curve can be placed on one side by the prescription dispenser, thus saving time and cost in the dispensation of the prescription lenses.

The making of multifocal blanks in the series where the number of multifocal additions are limited to a small minimum number but which will be adequate to fill the multifocal prescriptions throughout the range of requirements.

The making of a cerium glass lens medium, absorbent of the ultra-violet radiations of light which is substantially free from color and shadow casting properties.

2

The provision of units of the series both in single vision and in multifocal lenses.

Improved means for making the units of the series in lenticular form to decrease the weight of the lenses so they will be practical to wear with a maximum of comfort to the wearer.

Other objects and advantages of the invention will become apparent from the following description taken in conjunction with the accompanying drawings. It will be apparent that many changes may be made in the details of construction and the arrangement of parts and the steps of the processes without departing from the invention set forth in the accompanying claims, as the preferred matters have been set forth by way of illustration only.

Referring to the drawings.

Figure 1:
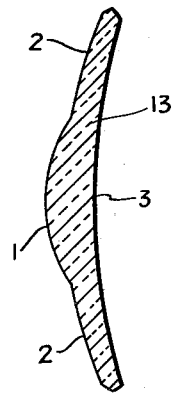
Fig. 1 is a vertical cross section of a single vision lenticular cataract lens of the invention.
Figure 2:
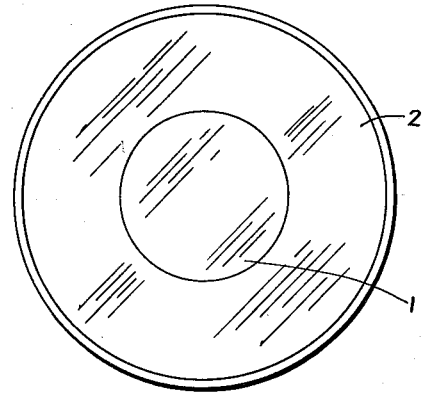
Fig. 2 is a front or plan view of Fig. 1.

Very high medical authority has held that the crystalline lens of the human eye is the medium that absorbs the ultra-violet radiations of light entering the eye, and that if this crystalline lens is taken out in an operation for cataract or other reason there is nothing left in the eye to prevent the retina of the eye from being disintegrated by the ultra-violet radiations.

Also as prescription lenses for cataract are of very strong power the lenses would be very heavy in weight, and cumbersome, uncomfortable and unsightly to wear if the lenses were made as the usual prescription lenses are made with the lens power surfaces extending from edge to edge of the lenses.

In the past lenticular cataract lenses have been dispensed by making the prescription to special order by the lens manufacturer. This, of course, is a highly expensive procedure and one that involves a long period of waiting by the patient for his lenses. Lens manufacturers are not equipped to give prompt service for finished prescription lenses.

It is therefore a principal object of this invention to provide a new lens medium absorbent to certain of the radiations of light beyond the visible, particularly the ultra-violet radiations, and at the same time to provide a series of cataract lens blanks in lenticular form both for single vision and for multifocal vision wherein the units of the series are made of this new lens medium, and the units of the series are kept to a minimum number both for single and multifocal vision to cover the practical range of cataract prescriptions, so that the finished cataract lens may be dispensed by the dispensers in the art by placing the required prescription curve on the blank so that these lenses may be dispensed just as other prescription lenses are dispensed, thus greatly improving the service to the patient and reducing the expense in the production and dispensing of these lenses.

Referring to the drawings wherein corresponding reference characters designate corresponding parts throughout:

Fig. 1 is a vertical cross section of a cataract lens of the invention. The surface 1 is the power surface. This comprises a circular spherical surface arranged in the center of the lens, like a bull's eye. The outer surface 2 is in the form of an annulus surrounding the surface 1. The object and use of this surface is to make the lens lighter in weight, so that it will be practical to wear making the lens as comfortable and as sightly to wear as possible. This surface is not intended to be a power surface.

The rear surface 3 is the prescription surface which is put on by the dispenser to give the required prescriptive power to the central portion 1 of the lens.

The surface 2 may be concentric with the surface 3 or not, just as desired. The central portion 1 of the lens is the portion used for vision. The portion 2 of the lens is merely a carrier and is not a vision portion. Its use is to give size to the lens for mounting and to carry with a minimum of weight the power portion 1.

The surfaces 1 and 2 are ground and polished on the lens medium by means of the prior art ring grinding method, substantially as shown in Figs. 5, 6, 7, and 8.

The lens blank is molded to substantially the required shape and size before the ring tools are applied.

The lenticular portion 2 is ground and polished by the ring tool 4 which spans over the portion 1. The blank is rotated and so is the tool 4 which is rotated by the spindle 5 driven by the pulley 6 and belt 7.

Figure 7:
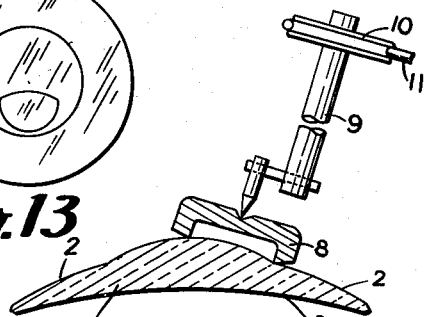
Fig. 7 is an elevation, partly in cross section, showing a ring tool generation of the inner or power portion of a cataract lens of the invention.

The portion 1 is ground and polished in a similar manner by the ring tool 8, Fig. 7, which spans over the center of the portion 1.

The tool 8 is rotated by the spindle 9, pulley 10 and belt 11.

The surface 3 is not ground and polished to prescription power by the manufacturer but is left free for the dispenser to perform this operation in the usual prior art way or for other forms of prescription lenses. The thickness of the blank is in excess of the thickness of the finished prescription lens, thus leaving material for the dispenser to apply the rear or prescription surface. The dispenser will use standard 1.53 index tools.

Any required surface may be placed on the side 3 by the dispenser, spherical, toric, prismatic or other surface as required by the prescription. The blank is left thick enough to provide operating allowance for the dispenser to work on.

Figure 3:
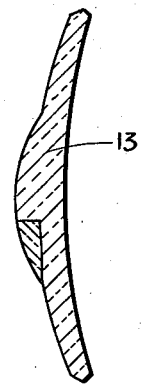
Fig. 3 is a vertical cross section of a multifocal lenticular cataract lens of the invention.
Figure 4:
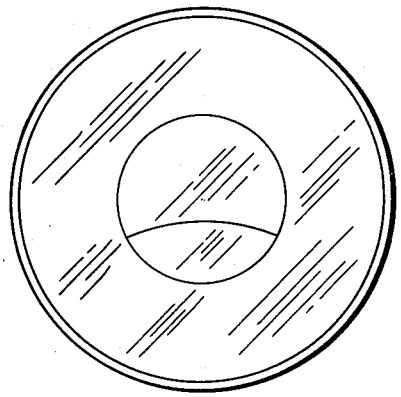
Fig. 4 is a front or plan view of Fig. 3.
Figure 5:
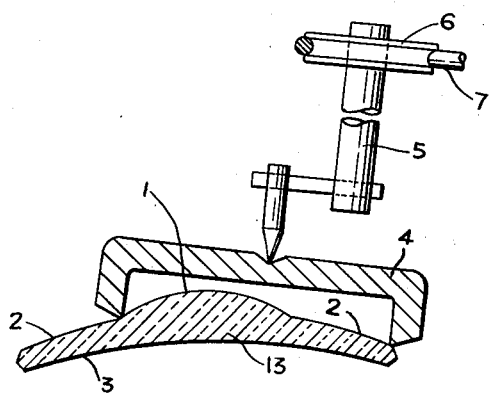
Fig. 5 is an elevation, partly in cross section, showing a ring tool generation of the marginal portion of a cataract lens of the invention.
Figure 6:
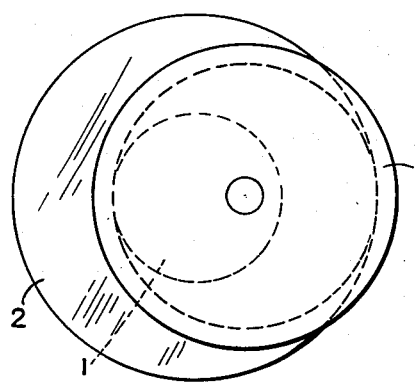
Fig. 6 is a top or plan view of Fig. 5.
Figure 9:
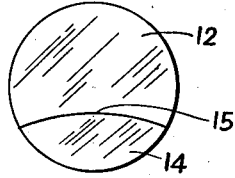
Fig. 9 is a top or plan view of a bifocal segment portion for a cataract lens of the invention.
Figure 8:
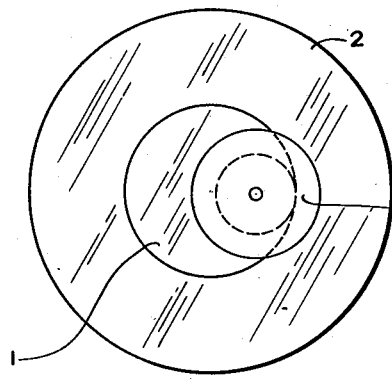
Fig. 8 is a top or plan view of Fig. 7.
Figure 10:
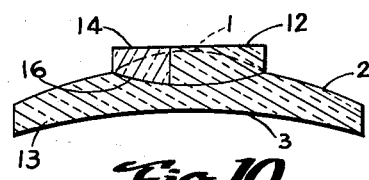
Fig. 10 is a cross section of a blank for a bifocal cataract lens of the invention showing the segment portion fused to the main body portion of the lens.

In the case of the bifocal or multifocal lenses shown in Figs. 3 and 4, this lens is made by making the bifocal segment in two parts as in Fig. 9. The top or upper part 12 is made of a lens medium that is the same as the lens medium of the main or major portion of the lens 13. The lower portion of the button or segment 14 is made of a lens medium different from that of the major portion 13 of the lens. The index of refraction of the part 14 is different from that of the part 12, but the expansion of the two parts are substantially the same and the dispersions of the two are related to reduce chromatic colors. The two parts are of a nature that will fuse thoroughly together.

The segment or button is divided on the line 15. The parts 12 and 14 are shaped to required size and shape and fused together along the line 15.

The main portion of the lens 13 is shaped to the surface 2 with a central seat or recess 16 to receive the fused segment or button. The underside of the button is shaped to the seat 16 and the fused segment is placed in and fused in the seat 16.

Figure 12:
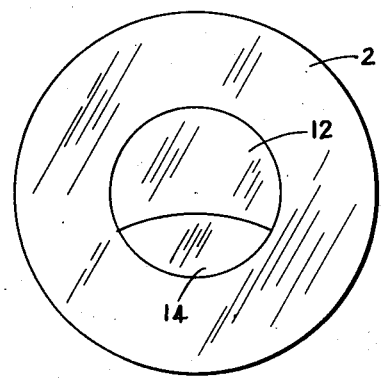
Fig. 12 is a top or plan view of Fig. 11.
Figure 11:
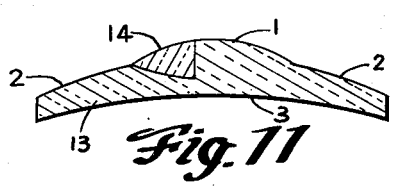
Fig. 11 is a cross section of a bifocal cataract lens showing the bifocal insert and the central or vision portion of the lens finished to curvature.

Then the segment or button is finished off to the power surface 1 by the ring tool method described above. The lens blank will then be as shown in Fig. 11. The portion 12 of the segment or button being of the same lens medium as the main lens portion 13 will disappear in the fusing and will blend into the part 13, the bifocal portion of the segment or button 14, being of a different lens medium from that of the main lens portion 13 will be distinct and visible as shown in Figs. 11 and 12 and indicated as 14 therein.

The underside of the blank 3 is left unfinished so the prescription dispenser can apply the required prescription surface thereon.

The nature and characteristics of the lens medium for the part 13 and the part 14 will be set forth hereunder.

The lens medium of the main or major lens portion 13 is an ophthalmic crown glass with sensibly pure cerium oxide added. The cerium oxide is from one to fifteen per cent by weight, with the preferred amount being approximately three per cent by weight.

This combination of the glass elements is made with care to avoid appreciable quantities of other coloring agents being introduced so as to reduce the variance from a colorless medium and also to reduce the casting of shadows.

The material of the bifocal or multifocal segment is a barium crown glass such as is now being used in the production of fused bifocal and multifocal lenses. This medium is related with that of the portion 13 so it will fuse perfectly therewith. The expansion properties of this segment medium is also related with that of the major portion 13 so the parts will remain together after fusion, and the dispersion properties of the segment are also related with those of the major portion 13, so color aberrations will be reduced from those present where a flint glass segment is employed.

Both glasses are chemically stable and free from oxidizing stains and blemishes.

The cerium ophthalmic crown glass has the property of absorbing considerably the ultraviolet radiations of light. Where from two to four percent of cerium oxide by weight is used, the lens medium will not transmit more than five per cent of the ultra-violet radiations at a wave length of 356 mm. or shorter, for a 2 millimeter thickness of the medium. The index of refraction of the major part 13 is substantially 1.523, and that of the segment portion 14 is substantially 1.616.

The bifocal additions for this series of blanks are 2.50–3.00 and 3.50 diopters.

A practical and useful diameter of the inner circular or power portion of the lens is 30 mm.

The lens blanks have been arranged in the following series and have certain characteristics tabulated hereunder:

[30 mm.—Center]

| Blank No. | Front Surface | |
|---|---|---|
| | Power | Radius |
| | | Mm. |
| 8 | +10.675 | 49.013 |
| 9 | +11.599 | 45.108 |
| 10 | +12.514 | 41.809 |
| 11 | +13.419 | 38.990 |
| 12 | +14.314 | 36.552 |
| 13 | +15.195 | 34.432 |
| 14 | +16.065 | 32.568 |
| 15 | +16.920 | 30.922 |
| 16 | +17.762 | 29.456 |
| 17 | +18.589 | 28.146 |

Maximum errors for + spheres −3 cylinders if finished to chart thickness:

| Blank No. | Maximum Axial Error |
|---|---|
| | Diopters |
| 8 | 0.04 |
| 9 | 0.04 |
| 10 | 0.04 |
| 11 | 0.04 |
| 12 | 0.04 |
| 13 | 0.04 |
| 14 | 0.05 |
| 15 | 0.05 |
| 16 | 0.05 |
| 17 | 0.06 |

Increase in power corresponding to 1 mm. increase in thickness:

| Blank No. | Increase In Power |
|---|---|
| | Diopters |
| 8 | 0.08 |
| 9 | 0.10 |
| 10 | 0.11 |
| 11 | 0.13 |
| 12 | 0.15 |
| 13 | 0.16 |
| 14 | 0.18 |
| 15 | 0.21 |
| 16 | 0.23 |
| 17 | 0.26 |

The following table shows the range of prescriptions obtained with series:

| Rx | Finished Thickness | Blank No. | Ocular Side (Side Nearest Eye) |
|---|---|---|---|
| | Mm. | | |
| +7.00—cyls. | 3.31 | 8 | −4.00—cyls. |
| +7.25—cyls. | 3.41 | 8 | −3.75—cyls. |
| +7.50—cyls. | 3.52 | 8 | −3.50—cyls. |
| +7.75—cyls. | 3.62 | 8 | −3.25—cyls. |
| +8.00—cyls. | 3.73 | 8 | −3.00—cyls. |
| +8.25—cyls. | 3.62 | 9 | −3.75—cyls. |
| +8.50—cyls. | 3.72 | 9 | −3.50—cyls. |
| +8.75—cyls. | 3.83 | 9 | −3.25—cyls. |
| +9.00—cyls. | 3.94 | 9 | −3.00—cyls. |
| +9.25—cyls. | 3.84 | 10 | −3.75—cyls. |
| +9.50—cyls. | 3.95 | 10 | −3.50—cyls. |
| +9.75—cyls. | 4.05 | 10 | −3.25—cyls. |
| +10.00—cyls. | 4.16 | 10 | −3.00—cyls. |
| +10.25—cyls. | 4.06 | 11 | −3.75—cyls. |
| +10.50—cyls. | 4.17 | 11 | −3.50—cyls. |
| +10.75—cyls. | 4.27 | 11 | −3.25—cyls. |
| +11.00—cyls. | 4.38 | 11 | −3.00—cyls. |
| +11.25—cyls. | 4.28 | 12 | −3.75—cyls. |
| +11.50—cyls. | 4.39 | 12 | −3.50—cyls. |
| +11.75—cyls. | 4.49 | 12 | −3.25—cyls. |
| +12.00—cyls. | 4.60 | 12 | −3.00—cyls. |
| +12.25—cyls. | 4.50 | 13 | −3.75—cyls. |
| +12.50—cyls. | 4.61 | 13 | −3.50—cyls. |
| +12.75—cyls. | 4.71 | 13 | −3.25—cyls. |
| +13.00—cyls. | 4.82 | 13 | −3.00—cyls. |
| +13.25—cyls. | 4.72 | 14 | −3.75—cyls. |
| +13.50—cyls. | 4.83 | 14 | −3.50—cyls. |
| +13.75—cyls. | 4.93 | 14 | −3.25—cyls. |
| +14.00—cyls. | 5.04 | 14 | −3.00—cyls. |
| +14.25—cyls. | 4.94 | 15 | −3.75—cyls. |
| +14.50—cyls. | 5.05 | 15 | −3.50—cyls. |
| +14.75—cyls. | 5.15 | 15 | −3.25—cyls. |
| +15.00—cyls. | 5.26 | 15 | −3.00—cyls. |
| +15.25—cyls. | 5.16 | 16 | −3.75—cyls. |
| +15.50—cyls. | 5.27 | 16 | −3.50—cyls. |
| +15.75—cyls. | 5.38 | 16 | −3.25—cyls. |
| +16.00—cyls. | 5.48 | 16 | −3.00—cyls. |
| +16.25—cyls. | 5.39 | 17 | −3.75—cyls. |
| +16.50—cyls. | 5.50 | 17 | −3.50—cyls. |
| +16.75—cyls. | 5.60 | 17 | −3.25—cyls. |
| +17.00—cyls. | 5.71 | 17 | −3.00—cyls. |

The series comprises ten different blanks finished to power on one side and unfinished on the opposite side. The ten blank units are of the powers and have the lens characteristics substantially as set forth above.

This series comprises the smallest preferred number of lens blank units to adequately fill the bulk of the usual required prescriptions. This series can be extended as desired.

The series starts at the number eight blank. This is because an eight diopter power is considered to be the weakest power required for cataract prescriptions. With a number eight blank having a minus three diopter (1.53 index) surface on the back an eight diopter power lens will be obtained.

The even power diopters are obtained by the use of a minus three diopter power on the back surface. Intermediate powers are interpolated, as for example, an 8.50 power lens is obtained by using a number 9 blank with a minus 3.50 diopter surface on the back. In interpolations the power on the back surface is changed and the next highest numbered blank is used.

The series described herein is entirely new in the art.

The reason for increasing the power of the back surface for interpolated intermediate powers is that by so doing the marginal error of focus and astigmatism are reduced and a better lens is obtained.

One of the great advantages of this series of lens blanks is that the blanks may be made by the lens manufacturer and supplied to the prescription dispenser who then can fill the required prescription by using the proper blank unit and putting on the rear or back surface to obtain the total prescriptive value of the lens. This reduces tremendously the time now required to fill a cataract prescription as the lens manufacturer is not efficiently equipped to give this special, individual service. In this way cataract prescriptions can be filled in the same manner that prescriptions for regular ophthalmic lenses are filled. This increases service to the patient and reduces materially the cost of filling cataract prescriptions.

From the foregoing, it will be seen that there has been provided a new lens medium having the property of the absorption of certain of the invisible radiations of light, particularly the ultraviolet radiations and that is transparent and substantially free from color and shadow casting properties and that will fuse perfectly with the multifocal segment where multifocal lenses are required and that there has been provided a new series of lenticular cataract lenses and blanks adapted to cover the usual range of cataract requirements and that provision is made by which these cataract prescription lenses may be dispensed by the prescription dispensers with the same facility that regular ophthalmic lenses are dispensed.

Figure 13:
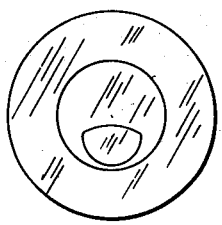
Fig. 13 is a front elevational view of a modified lens embodying the invention.
Figure 14:
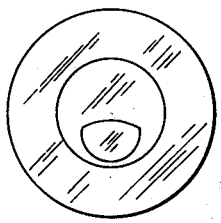
Fig. 14 is a view generally similar to Fig. 13 showing a further modification.

It is to be understood that any shape of segment desired and particularly the popular modern shapes now in vogue, such as shown in Figs. 13 and 14, may be used.

Means have been provided for obtaining all the objects and advantages of the invention in a practical, facile, and economical way.

Having described my invention, I claim:

1. A correction element for an individual's eye from which the crystalline lens has been removed, said element comprising a meniscus shaped carrier portion formed of transparent material having a given index of refraction, said carrier portion having a circular shaped seat on one side thereof surrounded by an annular-like surface portion of convex curvature and having on its opposed side a continuous concave curved surface extending from edge to edge of the element and defined by a single center and radius, said concave surface and annular-like convex surface of the carrier portion being disposed in nearly parallel relation, each having a relatively shallow curved shape, and an outwardly projecting button-like power portion of circular shape fused to said seat, the peripheral edges of said button-like portion substantially coinciding with the circular boundary of the seat, and said outwardly projecting button-like portion embodying at least two adjoining pieces of transparent material having different indices of refraction, with one of said pieces having an index of refraction substantially similar to that of the carrier portion, the outer surface of said button-like portion being of convex spherical shape and of relatively sharper curvature than the surrounding annular-like surface, said outer convex spherical surface of the button-like portion and concave surface of the carrier portion being related according to the indices of refraction of the pieces of the button-like portion and carrier portion and the thickness of material separating said surfaces to introduce desired dioptric power through said button-like portion, and the annular-like part of the carrier portion surrounding the button-like portion having substantially no power.

2. A correction element for an individual's eye from which the crystalline lens has been removed, said element comprising a meniscus shaped carrier portion formed of transparent material having a given index of refraction, said carrier portion having a circular shaped seat on one side thereof surrounded by an annular-like surface of convex curvature and having on its opposed side a continuous concave curved surface extending from edge to edge of the element and defined in at least one major meridian thereof by a single center and radius, and an outwardly projecting button-like power portion of circular shape fused to said seat, with the peripheral edges thereof substantially coinciding with the circular boundary of said seat, said outwardly projecting button-like portion embodying at least two adjoining pieces of transparent material having different indices of refraction, with one of said pieces having an index of refraction substantially similar to that of the carrier portion, the outer surface of said button-like portion being of convex spherical shape and of relatively sharper curvature than the surrounding annular-like surface, said outer convex spherical surface of the button-like portion, the surrounding annular-like surface, and concave surface of the carrier portion being so related according to the indices of refraction of the pieces of the button-like portion and carrier portion and the thickness of material separating said surfaces as to introduce desired dioptric power through said button-like portion and simultaneously reduce the surrounding annular-like part of the carrier portion to a minimum thickness.

EDGAR D. TILLYER.

REFERENCES CITED

The following references are of record in the file of this patent:

UNITED STATES PATENTS

| Number | Name | Date |
|---|---|---|
| 954,772 | Alexander | Apr. 12, 1910 |
| 1,715,784 | Rayton | June 4, 1929 |
| 1,865,715 | Tillyer | July 5, 1932 |
| 2,021,812 | Sterling | Nov. 19, 1935 |
| 2,164,801 | Dittmer | July 4, 1939 |
| 2,405,989 | Beach | Aug. 20, 1946 |

FOREIGN PATENTS

| Number | Country | Date |
|---|---|---|
| 380,416 | Germany | Sept. 7, 1923 |
| 386,163 | Great Britain | Jan. 12, 1933 |
| 466,620 | Great Britain | June 1, 1937 |
| 488,828 | Great Britain | July 14, 1938 |

OTHER REFERENCES

Emsley and Swain (Text) "Ophthalmic Lenses," published by Hatton Press Ltd. (1935), pages 138, 170 and 171.